(12) United States Patent
Takabayashi

(10) Patent No.: US 7,798,625 B2
(45) Date of Patent: Sep. 21, 2010

(54) ACTIVE RAY CURABLE INK-JET INK SET, IMAGE FORMING METHOD AND INK-JET RECORDING APPARATUS

(75) Inventor: Toshiyuki Takabayashi, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 773 days.

(21) Appl. No.: 11/664,155

(22) PCT Filed: Sep. 21, 2005

(86) PCT No.: PCT/JP2005/017337

§ 371 (c)(1),
(2), (4) Date: Mar. 29, 2007

(87) PCT Pub. No.: WO2006/038458

PCT Pub. Date: Apr. 13, 2006

(65) Prior Publication Data

US 2008/0124483 A1 May 29, 2008

(30) Foreign Application Priority Data

Oct. 4, 2004 (JP) .............................. 2004-291132

(51) Int. Cl.
*C09D 11/00* (2006.01)
*B41J 2/01* (2006.01)

(52) U.S. Cl. ..................... 347/88; 427/466; 522/71; 522/83; 522/168; 522/170

(58) Field of Classification Search .................. 347/88; 427/466; 522/71, 83, 168, 170, 181
See application file for complete search history.

(56) References Cited

U.S. PATENT DOCUMENTS

| | | | |
|---|---|---|---|
| 6,790,875 B2 * | 9/2004 | Noguchi et al. | 522/84 |
| 7,304,095 B2 * | 12/2007 | Masumi et al. | 522/81 |
| 7,434,899 B2 * | 10/2008 | Nakajima | 347/6 |
| 2004/0024091 A1 * | 2/2004 | Yamada et al. | 523/160 |
| 2004/0050292 A1 * | 3/2004 | Nakajima et al. | 106/31.27 |
| 2006/0052473 A1 * | 3/2006 | Takabayashi | 522/71 |
| 2008/0074480 A1 * | 3/2008 | Tojo et al. | 347/100 |

* cited by examiner

*Primary Examiner*—Susan W Berman
(74) *Attorney, Agent, or Firm*—Finnegan, Henderson, Farabow, Garrett & Dunner, L.L.P.

(57) ABSTRACT

An active ray curable ink-jet ink set comprising an active ray curable yellow ink, an active ray curable cyan ink, an active ray curable black ink, and further one or more active ray curable color inks other than yellow, cyan and black, wherein each of the active ray curable inks contains a photo-polymerization initiator, a photo-polymerizable compound, a pigment, and a dispersing agent which has an amine value and an acid value, provided that the acid value is higher than the amine value, and an average particle diameter of the pigment contained in the yellow ink is larger than that of the pigment in the cyan ink and than that of the pigment in the black ink by 0.025-0.090 μm, and further the average particle diameter of the pigment contained in each of the inks of the active ray curable ink-jet ink set is 0.070-0.220 μm.

13 Claims, 2 Drawing Sheets

ACTIVE RAY CURABLE INK-JET INK SET, IMAGE FORMING METHOD AND INK-JET RECORDING APPARATUS

FIELD OF THE INVENTION

The present invention relates to an image forming method and an ink-jet recording apparatus using an active ray curable ink-jet ink, also simply referred to as ink, by which a high definition image can be stably reproduced on various recording media.

TECHNICAL BACKGROUND

Recently, ink-jet recording systems have been applied in various fields of printing such as printing on photographs, various type of prints, marking, and color filters since images can be formed simply at a low price by ink-jet technology. Image quality comparable to pictures by silver salt photography can be obtained by using image recording apparatuses capable of ejecting and controlling fine dots of ink, inks exhibiting an improved color reproducing range, image durability and ink ejection suitability, as well as exclusive paper considerably improved in ink absorbability, color appearance of the coloring material and image surface glossiness. The improved image quality of current ink-jet recording systems has been attained only by combination of the recording apparatus, ink and exclusive paper.

However, ink-jet systems requiring exclusive paper poses problems such as restrictions of such paper and cost of the recording media. Consequently, various trials for recording an image on recording media other than exclusive paper have been carried out. Specifically, such methods include a phase changing ink-jet system using a wax based ink which is solid at room temperature, a solvent type ink-jet system using an ink principally composed of a quick drying organic solvent and a UV ink-jet system using an ink curable by ultraviolet rays (being UV light).

Among these, the UV ink-jet system has recently become popular because due to its relatively reduced odor than the solvent type ink-jet system, and capable of printing on recording media which lack the ability of quick drying and ink absorbability, as well as UV curable ink-jet inks have been disclosed, cf. Patent Documents 1-5, for example.

As the coloring material, pigment dispersion is frequently used from the viewpoint of color fastness. A polar group derived from a polymerizable group is incorporated in the active ray curable ink-jet ink even though the ink employs solvent. However, the pigment does not readily adsorb the dispersing agent in such a system. Dispersion of the pigment is a more important problem in the ink-jet ink compared to the typical paints. When the dispersion is not uniform, ejection of the ink becomes unstable and a major problem when using ink-jet ink.

It is widely known that pigment in usual active ray curable ink can be dispersed using a basic dispersing agent. However, stable dispersion could not be obtained during the testing by the inventors. Further, limitations due to the number of coarse particle is disclosed, for example, in Patent Documents 6 and 7, but stable ejection even with such limitation, cannot be attained of non-aqueous active ray curable ink. As a result, high definition images cannot be recorded at high reproducibility and high production stability.

Patent Document 1: Unexamined Japanese Patent Application Publication No. (hereinafter, referred to as JP-A) 6-200204 (Claims and Examples)

Patent Document 2: JP-A 2000-504778 (Claims and Examples)

Patent Document 3: JP-A 2002-188025 (Claims and Examples)

Patent Document 4: JP-A 2002-60463 (Claims and Examples)

Patent Document 5: JP-A 2003-252979 (Claims and Examples)

Patent Document 6: JP-A 11-140356 (Claims and Examples)

Patent Document 7: JP-A 2000-204305 (Claims and Examples)

DISCLOSURE OF THE INVENTION

Problems to be Solved by the Invention

This invention is carried out based on the above-mentioned background. An object of the invention is to provide a set of active ray curable ink-jet inks, an image forming method and an ink-jet recording apparatus.

Means to Solve the Problems

The above object can be attained by the following constitution.

(1) An active ray curable ink-jet ink set comprising active ray curable ink-jet inks each containing a photo-polymerization initiator, a photo-polymerizable compound, a pigment, and a dispersing agent having both an amine value and an acid value, provided that the acid value is higher than the amine value, wherein the active ray curable ink-jet ink set comprises at least a yellow, cyan, black and one or more color ink other than the above colors. Further, an average particle diameter of the pigment in the yellow ink is larger than an average particle diameter of the pigment of the cyan ink and an average particle diameter of the pigment of the black ink by 0.025-0.090 μm, and an average particle diameter of the pigments in each of the color inks are 0.070-0.220 μm.

(2) An active ray curable ink-jet ink set comprising active ray curable ink-jet inks each containing a photo-polymerization initiator, a photo-polymerizable compound, a pigment and a dispersing agent having an amine value and an acid value, provided that the acid value is higher than the amine value, wherein the active ray curable ink-jet ink set at least comprises a yellow, cyan, and black, and one or more inks each having a color other than the above colors. Further, an average particle diameter of the pigment contained in the yellow ink is within the range of 0.130-0.220 μm and an average particle diameter of each of the cyan ink and the black ink is within the range of 0.070-0.220 μm.

(3) The active ray curable ink-jet ink set described in above (1) comprising active ray curable ink-jet inks each containing a photo-polymerization initiator, a photo-polymerizable compound, a pigment and a dispersing agent having an amine value and an acid value, provided that the acid value is higher than the amine value, wherein the active ray curable ink-jet ink set comprises at least a yellow, cyan, and black, and one or more inks each having a color other than the above colors, and an average particle diameter of the pigment in the yellow ink is within the range of from 0.130 to 0.220 μm and average particle diameters of each of the color inks are within the range of 0.070-0.220 μm.

(4) The active ray curable ink-jet ink set described in above (2) or (3), wherein the ink set includes magenta ink having an average particle diameter of the pigment of 0.100-0.150 μm.

(5) The active ray curable ink-jet ink set described in any one of above (2)-(4), wherein the ink set includes white ink having an average particle diameter of the pigment of 0.130-0.220 µm.

(6) The active ray curable ink-jet ink set described in any one of (1)-(5), wherein each of the ink-jet inks contains an oxirane compound as the photo-polymerizable compound.

(7) The active ray curable ink-jet ink set described in any one of (1)-(6), wherein each of the inks contains 30-95% by weight of a compound having an oxetane ring, 5-70% by weight of a compound having an oxirane group and 0-40% by weight of a vinyl ether compound as the photo-polymerizable compound.

(8) The active ray curable ink-jet ink set described in any one of (1)-(7), wherein the viscosity of each of the inks at 25° C. is within the range of 7-50 mPa·s.

(9) A method for forming an image by ejecting the active ray curable ink-jet inks of the active ray curable ink-jet ink set described in any one of (1)-(8) from an ink-jet recording head onto a recording medium, wherein active rays are irradiated within 0.001-1.0 second after the landing of the active ray curable ink-jet ink onto the recording medium.

(10) A method for forming an image by ejecting the active ray curable ink-jet inks of the active ray curable ink-jet ink set described in any one of (1)-(8) from an ink-jet recording head onto a recording medium, wherein the total thickness of the ink layers after landed and then cured by irradiation of active rays is 2-20 µm.

(11) A method for forming an image by ejecting the active ray curable ink-jet ink of the active ray curable ink-jet ink set described in any one of (1)-(8) from an ink-jet recording head onto a recording medium, wherein the volume of the ink droplets ejected from each nozzle of the ink-jet recording head is 2-15 pl.

(12) The image forming method described in any one of (9)-(11), wherein the image is formed by ejecting the inks from a line head type recording head.

(13) An ink-jet recording apparatus to be used for the image forming method described in any one of (9)-(12), wherein the ink-jet recording apparatus has a mechanism to heat the active ray curable ink-jet inks and the recording head to a temperature of 35-100° C. before ejecting the inks.

DESCRIPTION OF SYMBOLS

Figure 1:
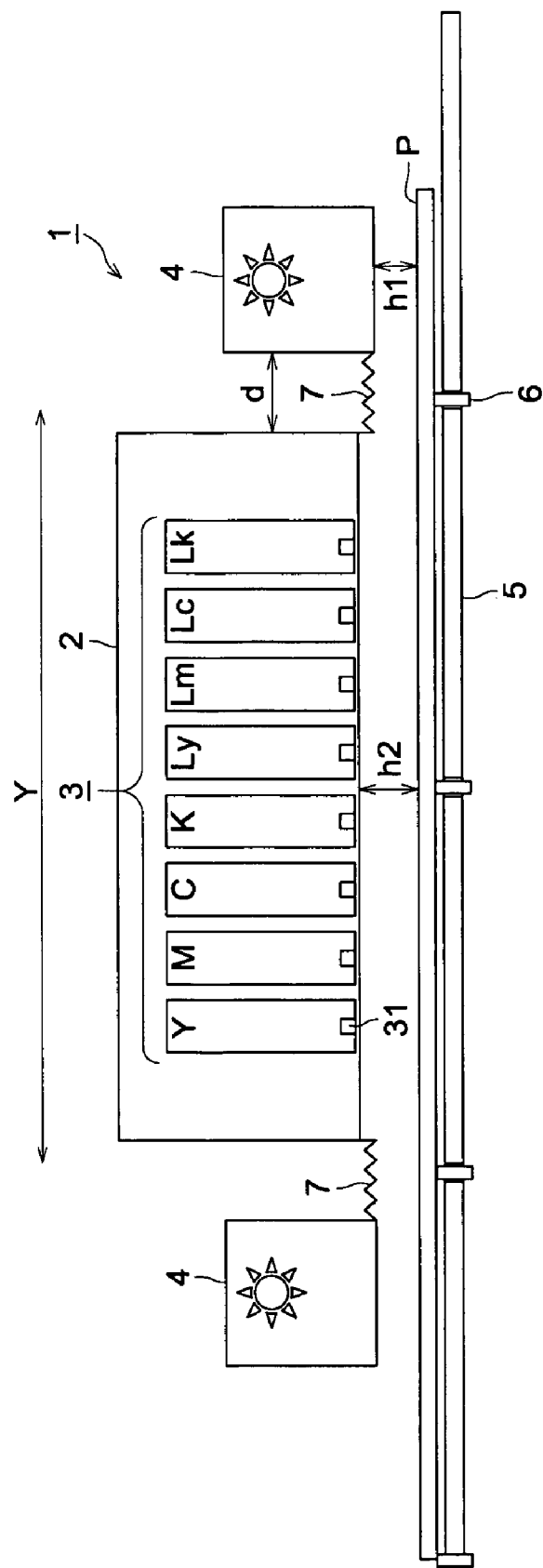
FIG. 1 is a front view of an example of a constitution of primary sub-systems of an ink-jet recording apparatus of the invention.

1: Recording apparatus
2: Head carriage
3: Recording head
31: Ink ejecting opening
4: Irradiation means
5: Platen portion
6: Guiding member
7: Bellows structure
8: Irradiation light source
P: Recording medium

THE BEST EMBODIMENT FOR EMBODYING THE INVENTION

This invention is described in detail below. As a result of investigations by the inventors, it was found that a high-definition image can very stably be formed (that is, the ejection capability and coloring capability of each of the colored inks can be improved) by using an active ray curable ink set (also simply referred to as an ink set) of four or more colored inks in which a dispersing agent, exhibiting an amine value and an acid value, provided that the acid value is higher than the amine value, is used and the average particle diameter of the yellow ink is 0.025-0.090 µm larger than that of the cyan ink or the black ink. In this invention, "the average particle diameter" is the volume average diameter of particles contained in each of the inks and measured by a diameter measuring apparatus by a dynamic light scattering method such as the Zetasizer Nano Series manufactured by Malvern Instruments Co., Ltd. Similar results can also be obtained by use of an ink set in which the average particle diameter of the particles in the yellow ink is 0.130-0.220 µm and the average particle diameter of particles in the cyan ink and the black ink are each within the range of 0.70-0.120 µm, however it is more preferable to satisfy both of the above conditions. Moreover, the average particle diameter of particles in the magenta ink is more preferably 0.130-0.220 µm. When a white ink is used, the average particle diameter of the particles in the ink is particularly preferably 0.130-0.220 µm. Such conditions are specifically effective when the volume of ink droplets ejected from each of the nozzles of the recording head is as small as 2-15 pl.

Further, it was also found that the above effects on ejecting capability and coloring capability are enhanced and high definition images can be stably formed when the photo-polymerization system is a cationic photo-polymerization system using a photo-acid-generating agent as the photo-polymerization initiator and an epoxy compound and/or an oxetane compound as the photo-polymerizable compound.

The acid value and the amine value of this invention can be determined by potentiometric titration. For example, measurement can be carried out by the method described in Journal of the Japan Society of Colour Material, 61, [12] 692-698, 1988. When plural colors of pigment or kinds of dispersing agents are used, a weight average of them can be applied.

In this invention, it is preferable that the dispersing agent exhibits both the acid value and the amine value, and the acid value must be higher than the amine value, and differ preferably from 1 mg/g KOH to less than 30 mg/g KOH. The desired effect cannot be obtained when the difference is less than 1 mg/g KOH, and concern of adequate curing by thermal reaction is a factor when the difference is 30 mg/g KOH or more. As a dispersing agent, a high molecular weight one is preferably used though both of the low molecular weight one and the high molecular weight one can be used. Specific examples of preferable dispersing agent include Ajisper PB824, PB822 and PB821, each manufactured by Ajinomoto Finetechno Co., Ltd., Hinoact KF-1300M, KF-1700 and T-6000, each manufactured by Kawaken Fine Chemicals Co., Ltd., but this invention is not limited to them.

As specific examples of the pigments, the followings can be cited though the invention is not limited to them: C.I. Pigment Yellow 1, 2, 3, 12, 13, 14, 16, 17, 73, 74, 75, 81, 83, 87, 93, 95, 97, 98, 109, 114, 120, 128, 129, 138, 151, 154, 180 and 185, C. I. Pigment Red 5, 7, 12, 22, 38, 48:1, 48:2, 48:4, 49:1, 53:1, 57:1, 63:1, 101, 112, 123, 144, 146, 168, 184, 185 and 202, C. I. Pigment Violet 19 and 23, C. I. Pigment Blue 1, 2, 3, 15:2, 15:2, 15:3, 15:4, 18, 22, 27, 29, and 60, C. I. Pigment Green 7 and 36, C. I. Pigment White 6, 18 and 21, and C. I. Pigment Black 7.

The pigments may be subjected to various known surface treatments according to necessity.

For dispersing the above-mentioned pigments, a ball mill, a sand mill, an attriter, a roller mill, an agitator, a Henschel mixer, a colloid mill, an ultrasonic homogenizer, a pearl mill, a wet jet mill and a paint shaker can be employed. A synergist corresponding to the pigment can be used as the dispersing aid according to necessity. The dispersing agent and the synergist are preferably added in an amount of from 1-50 parts by weight to 100 parts by weight of the pigment. As the dispersing medium, a solvent or a polymerizable compound may be used, and the dispersion is preferably carried out without any solvent in the active ray curable ink-jet ink to be used in this invention because the ink is cured by reaction just after the ink landing. When the solvent remains in the cured image, problems of degradation in solvent resistivity of the image and VOC of the remaining solvent are caused. Accordingly, the dispersing medium is not solvent and preferably polymerizable compounds, and the monomer having lowest viscosity among the polymerizable compounds is preferably selected from the viewpoint of the dispersion suitability.

In this invention, it is necessary that the ink set is composed of four or more color inks and the average particle diameter of the particles in the yellow ink is larger from 0.025 to 0.090 μm than the average particle diameter of the cyan and black inks and the average particle diameters of the particles in the entire color inks are less than 0.220 μm. When the difference between the average particle diameter of the particles in the yellow ink and those of the cyan and black inks is less than 0.025 μm, the color appearance of the yellow ink is inferior to that of other color inks and a problem on the dispersion stability (being a tendency of over dispersion) is posed. When the difference exceeds 0.090 μm, graininess and ejection suitability are degraded so that the high definition image cannot be formed. When the average particle size of the ink exceeds 0.220 μm (including after storage), sojourn in the flowing pass in the recording head causes a problem. Such the situation is particularly severe in the case of the white ink.

In this invention, the ink set is composed of 4 or more color inks and the average particle size of the particles in the yellow ink is within the range of 0.130-0.22 μm and the average particle diameters of the particles in the cyan and black inks are each within the range of 0.070-0.120 μm. Such the values are the optimum values for stably forming high definition image found by the inventors based on the ejection stability, color appearance and graininess.

Moreover, it is preferable to satisfy both of the above conditions.

The average particle diameter of the particles in the magenta ink is also preferably 0.100-0.150 μm and the average particle diameter of those in the white ink is also preferable within the range of 0.130-0.220 μm from the viewpoint of the hiding power.

The average particle diameter can be suitably controlled by selection of a kind of pigment, kind of dispersing agent and dispersing conditions. The particle diameters of the pigments are each smaller, preferably ½ to 1/10, than the average particle size of the corresponding ink.

In this invention, it is preferable to contain a compound having an oxirane group as the photo-polymerizable compound to improve the curing capability and the ejection suitability.

Various kinds of known cationic polymerizable monomer can be used for the photo-polymerizable compound. For example, the epoxy compounds, vinyl ether compounds and oxetane compounds exemplified in JP-A 6-9714, 2001-31892, 2001-40068, 2001-55507, 2001-310938, 2001-310937 and 2001-220526 can be cited.

The epoxy compounds include the following aromatic epoxides, alicyclic epoxides and aliphatic epoxides.

Preferable aromatic epoxide is a polyhydric phenol having at least one aromatic nucleus or a di- or poly-glycidyl ether formed by reaction of the above epoxide or an alkylene oxide adduct of the epoxide with epichlorohydrine such a d- or poly-glycidyl ether of bisphenol A or an adduct of bisphenol A with polyethylene oxide, a d- or poly-glycidyl ether of hydrogenised bisphenol A or an adduct of hydrogenised bisphenol A with polyethylene oxide, and a novolac type epoxy resin. The above alkylene oxide is preferably ethylene oxide and propylene oxide.

As the alicyclic epoxide, a compound containing cyclohexene oxide or cyclopentene oxide is preferable, which can be obtained by epoxidizing a compound having a cycloalkane ring such as a cyclohexene ring or cyclopentene ring by a suitable oxidant such as hydrogen peroxide, and a peracid.

As the aliphatic epoxide, di- or poly-glycidyl ether of aliphatic polyhydric alcohol and an alkylene oxide adduct of the aliphatic polyhydric alcohol are preferable. Examples of such compounds include a diglycidyl ether of alkylene glycol such as diglycidyl ether of ethylene glycol, diglycidyl ether of propylene glycol and diglycidyl ether of 6-hexanediol; a polyglycidyl ether of a polyhydric alcohol such as d- or tri-glycidyl ether of glycerol and its adduct with an alkylene oxide; and a diglycidyl ether of a polyalkylene glycol such as diglycidyl ether of polyethylene glycol and its alkylene oxide adduct and diglycidyl ether of polypropylene glycol or its alkylene oxide adduct. In the above, ethylene oxide and propylene oxide are cited as the alkylene oxide.

Among the above epoxides, the aromatic epoxide and the alicyclic epoxide, particularly the alicyclic epoxide, are preferable from the viewpoint of quick curability. In this invention, the above epoxides may be used singly or in a suitable combination.

In this invention, it is particularly preferable that the epoxy compound having an oxirane group is at least one of an epoxidized fatty acid ester and an epoxidized fatty acid glyceride from the viewpoint of the safeness such as AMES TEST and sensitization.

As the epoxidized fatty acid ester and the epoxidized fatty acid glyceride, epoxy group-introduced fatty acid esters and epoxy group-introduced fatty acid glycerides are usable without any limitation. As the epoxidized fatty acid, ones produced by epoxidizing an oleic acid ester such as methyl epoxystearate, butyl epoxystearate and octyl epoxystearate are usable. As the epoxidized fatty acid glyceride, epoxidized soy bean oil, epoxidized linseed oil and epoxidized castor oil each produced by epoxidizing soy bean oil, linseed oil and castor, respectively, are usable.

In this invention, it is preferable for further improving the ejection stability that the ink contains from 30 to 50 parts by weight of the compound having the oxetane group, from 5 to 70 parts by weight of the compound having the oxirane group and from 0 to 40 parts by weight of the vinyl ether compound.

In this invention, any known oxetane compound such as those disclosed in JP-A 2001-220526 and 2001-310937 is usable.

Examples of the vinyl ether compound usable in this invention include a di- or tri-vinyl ether compound such as ethylene glycol divinyl ether, diethylene glycol divinyl ether, triethylene glycol divinyl ether, propylene glycol divinyl ether, dipropylene glycol divinyl ether, triethylene glycol divinyl ether, propylene glycol divinyl ether, dipropylene glycol divinyl ether, butanediol divinyl ether, hexanediol divinyl ether, cycloheanedimethanol divinyl ether and trimethylolpropane trivinyl ether, and a monovinyl ether compound such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylenecarbonate, dodecyl vinyl ether and octadecyl vinyl ether.

Among these vinyl ether compounds, the di- and tri-vinyl ether compounds, particularly divinyl ether compounds, are preferable when the curability, adhesiveness and surface hardness are considered. In this invention, the vinyl ether compounds may be used singly or in a suitable combination.

In this invention, a radical polymerizable compound also can be used. As the radical polymerizable compound, any known meth(acrylate)monomers or oligomers are usable.

Examples of the radical polymerizable compound include a mono-functional monomer such as isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-phenoxypropyl acrylate, 2-acyloyloxyethylsuccinic acid, 2-acryloyloxyethylphthalic acid, 2-acryloyloxyethyl-2-hydroxyethylphthalic acid, lactone-modified flexible acrylate and t-butylcyclohexyl acrylate, a di-functional monomer such as triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, diacrylate of bisphenol A PO adduct, hydroxylpivalic acid neopentyl glycol diacrylate and polytetramethylene glycol diacrylate, and a tri or more multi-functional monomer such as trimethylolpropane triacrylate, EO-modified trimethylpropane triacrylate, pentaerythrytol triacrylate, pentaerythritol tetracrylate, dipentaerythritol hexacrylate, ditrimethylolpropane tetracrylate, glycerinpropoxy triacrylate, caprolactone-modified trimethylolpropane triacrylate, pentaerythrytol-ethoxy tetracarylate, and caproluctum-modified dipentaerythritol hexacrylate.

Any known photo-polymerization initiator can be used for the active ray curable ink. As the photo-polymerization initiator, a photo-acid-generating agent and a photo-radical-generating agent are usable.

For example, compounds applied for a chemically amplifying photoresist or cationic photopolymerization are used as the photo-acid-generating agent, cf. "Organic Materials for Imaging", edited by Yuuki Electronics Zairyo Kenkyukai, 187-192, Bunshin Shuppan, 1993. Examples of the compound suitable for the invention are described below.

Firstly, a salt of $B(C_6H_5)_4$, $PF_6$, $AsF_6$, $SbF_6$ or $CF_3SO_3$ of an aromatic onium compound such as diazonium, ammonium, iodonium, sulfonium and phosphonium can be cited.

Concrete examples of the onium compound usable in this invention are listed below.

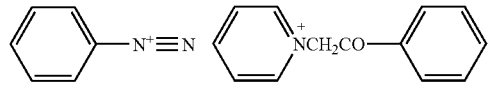

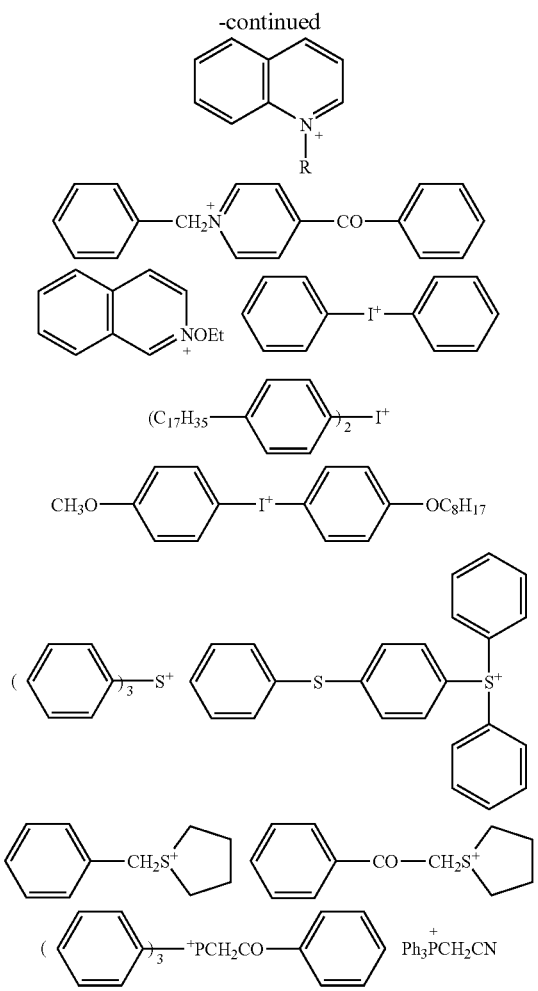

Secondarily, a sulfonated compound capable of generating a sulfonic acid can be cited. Concrete examples of such the compound are listed below.

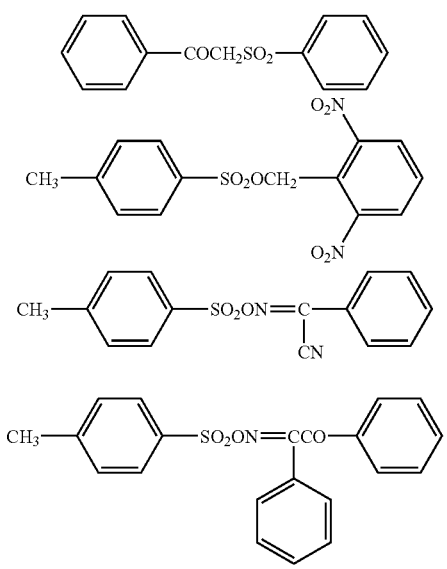

-continued

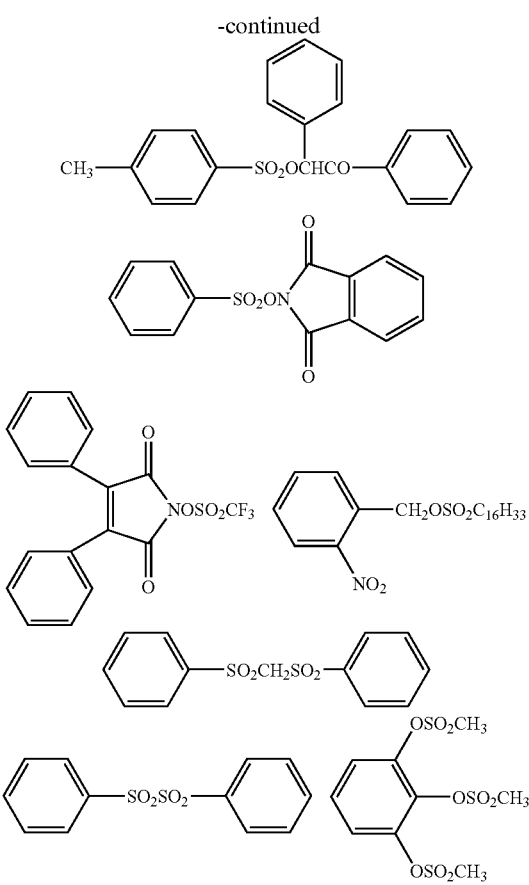

Thirdly, a halogenized compound capable of generating hydrogen halide can be also used. Concrete examples of such the compound are listed below.

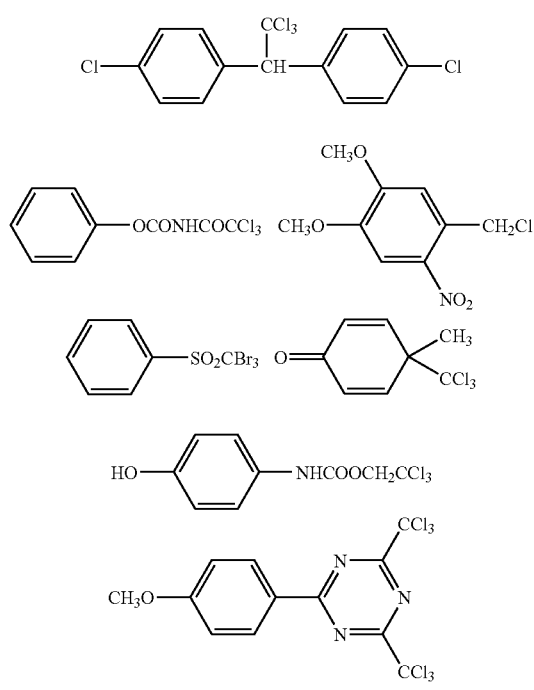

Fourthly, an iron-allen complex can be cited.

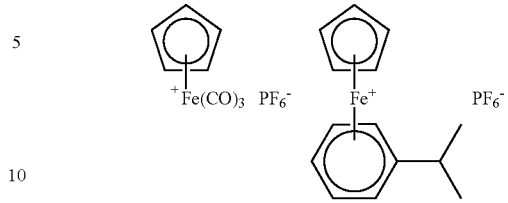

As the photo-radical-generating agent to be used in this invention, known photo-radical-generating agent such as an aryl alkyl ketone, an oxime ketone, an S-phenyl thiobenzoate, titanocene, an aromatic ketone, a thioxanthone, a derivative of benzyl and a quinine and a ketocoumaline can be used. Such the materials were described in detail in "UV•EB Kouka Gijutu no Ouyou to Shijou (Application and Market of UV•EB Curing Technology)" supervised by Y. Tabata/edited by RadTec Japan. Among them, an acylphosphine oxide and an acylphosphonate are particularly effective for internal curing of the ink image having a thickness of from 5 to 12 μm per one color such as that formed by ink-jet printing because these compounds have high sensitivity and light absorption by the compound is reduced by photo-cleavage of the initiator. Concretely, bis(2,4,6-trimethylbenzoyl)-phenylphosphine oxide, bis(2,6-dimethoxybenzoyl)-2,4,4-trimethyl-pentyl phosphine oxide are preferable.

1-hydroxy-cyclohexyl-phenyl-ketone, 2-methyl-1[4-(methylthio)phenyl]-2-morpholinopropane-1-one, bis(2,6-dimethoxybenzoyl)-2,4,4-trimethyl-pentylphosphine oxide, 2-hydroxy-2-methyl-1-phenyl-propane-1-one (Darocur® 1173) are suitably used when safeness is considered. Preferable adding amount is from 1 to 6% by weight, more preferably from 2 to 5% by weight.

Viscosity of the ink of the invention is preferably from 7 to 50 mPa·s for obtaining stable ejection not depending on the curing condition (temperature and humidity) and good curing ability.

As the recording material usable in this invention, usual non-coated and coated paper, various non-absorbing plastics and their films used for soft wrapping can be used. Examples of the various plastics include PET film, OPS film, OPP film, ONy film, PVC film, PE film and TAC film. Other than the above, polycarbonate, acryl resin, ABS, polyacetal, PVA and rubbers are usable. Metals and glass are also applicable. The constitution of the invention is effective for forming an image on a thermally shrinkable film such as the PET film, OPS film, OPP film, ONy film and PVC film among the above-mentioned. These films are easily curled or deformed by shrinking accompanied with curing of the ink and heat generated by the curing reaction and the ink layer is difficulty followed with the shrinking of the vase material.

These plastics are largely different in the surface energy from each other. Therefore, a problem has been posed hitherto that the diameter of ink dot after landing is varied. Suitable high definition image can be formed by the invention on various recording materials having surface energy of wide range of from 35 to 60 mN/m including OPP film and OPS film having low surface energy and PET film having relatively high surface energy.

In this invention, the use of long length web of recording material is more advantageous from the viewpoint of the cost of the recording material including packaging and production cost of the material, production cost of the print and corresponding ability to printing size.

The image forming method of the invention is described below.

In the image forming method of this invention, a method is preferable, in which the above-described ink is ejected onto the recording material by the ink-jet recording system for drawing an image and then irradiated by active ray such as UV-rays for curing the ink.

(The Total Thickness of Ink Layer after Landing)

In this invention, the total thickness of the ink layer after landing and cured by active ray irradiation is preferably from 2 to 20 μm. It is present condition that the total thickness of the ink layer exceeds 20 μm in the active ray curable ink-jet recording in the field of screen printing. In the field of soft warping material printing frequently using thin plastic sheet, however, excessive ejection of the ink is not preferable because a problem such as that the stiffness and quality feeling of the material are entirely varied is posed additionally to the foregoing problems of occurrence of curl and wrinkles.

The "total thickness of the ink" is the largest value of the ink layer drawn on the recording material, and such the means of the terms is the same even when the image is formed by piling two colors (secondary color), three colors, four colors (white ink base) by the ink-jet recording system.

(Ink Ejecting Conditions)

It is preferable for stably ejecting the ink that the recording head and the ink are heated by a temperature of from 35 to 100° C. The viscosity of the active ray curable ink-jet ink is largely varied depending on the temperature and the variation of viscosity largely influences on the droplet ejecting speed and causes degradation in the image quality. Therefore, it is necessary to raise and constantly keep the temperature. The controlling allowance of the ink temperature is preferably set at ±5° C., more preferably ±2° C., and further preferably ±1° C.

In this invention, the volume of the droplet ejected from each of the nozzles is preferably from 2 to 15 pl.

Essentially, the droplet volume within such the range is necessary for forming the high definition image and the requirement of ejection stability is particularly made sever for ejecting the droplet having such the volume. The ejection stability of the small volume droplet of from 2 to 15 pl is raised and the high definition image can be stably formed by the invention.

(Light Irradiating Conditions after Ink Landing)

In the image forming method of this invention, the active ray is preferably irradiated within the range of from 0.01 to 1.0 seconds and more preferably from 0.001 to 0.8 seconds after landing of the ink droplets. It is particularly important to form high definition images that the timing of the irradiation is as shorter as possible.

The basic method for irradiating the active ray is disclosed in JP-A 60-132767. By this method, light sources are provided on both sides of the head unit and the head and light source scans by a shuttle system. Consequently, the irradiation is carried out after a certain time lag. Moreover, the curing is completed by another light source without driving. Another method is disclosed in U.S. Pat. No. 6,145,979 in which a method using optical fiber and a method in which collimated light is reflected by a mirror arranged on both sides of the head unit so as to irradiate UV-rays to the recording portion. Any irradiation method such as those described above can be applied in the image forming method of the invention.

It is also one of preferable embodiments in which the active ray irradiation is separated into two steps and the active ray is irradiated within duration of from 0.001 to 2.0 seconds by the above-mentioned method and the active ray is further irradiated after completion of printing of the whole image. The shrinkage caused on the occasion of curing of the ink can be inhibited by separating the irradiation into the two steps.

Hitherto, a high illuminance light source exceeding 1 kW·hr in power consumption is usually used in the UV ink-jet system for inhibiting expansion and spreading of the dot after ink landing. It is present situation that such the light source cannot be practically applied because shrinking of the recording material is too large, particularly in the case of printing on a shrink label.

In this invention, the high definition image can be formed even when a light source consuming power of less than 1 kW per hour and the shrinkage of the recording material can be inhibited to a level acceptable for practical use. Examples of the light source spending less than 1 kW per hour of electric power include a fluorescent tube, a cold cathode tube and LED though the light source is not limited to the above.

The ink-jet recording apparatus of the invention, hereinafter simply referred to as the recording apparatus, is described below.

The recording apparatus of the invention is described below referring drawings. The recording apparatus shown in the drawings is an embodiment of the recording apparatus of the invention and the apparatus of the invention is not limited to those shown in the drawings.

FIG. 1 is the front view of the constitution of principal portion of the recording apparatus of the invention. The recording apparatus 1 is constituted by a head carriage 2, a recording head 3, an irradiating means 4 and a platen 5. In the recording apparatus 1, the platen 5 is provided under a recording material P and the platen 5 has UV-ray absorbing ability and absorbs excessive UV-ray permeated through the recording material P. As a result of that, a high definition image can be reproduced with very high stability.

The recording material P is guided by a guiding member 6 and conveyed in the direction of from this side to inside of FIG. 1 by a conveying means not shown in the drawing. The recording material is scanned by the recording head 3 held by the head carriage 2 moved back-and-forth in the direction Y in FIG. 1 by a head scanning means not shown in the drawing.

The head carriage 2 is provided on upper side of the recording material P and carries plural recording heads corresponding to the number of colors used for printing the image onto the recording material P, which are set toward the lower side. The head carriage 2 is provided on the recording apparatus in a state of freely movable back-and-forth in the direction Y in FIG. 1. The head carriage is moved back-and-forth in the direction Y in FIG. 1 by driving by a head scanning means.

In FIG. 1, the head carriage 2 contains the recording heads of yellow Y, magenta M, cyan C, black K, light yellow Ly, light magenta Lm, light cyan Lc and light black Lk. However, the number of the colors of the recording heads 3 to be set in the head carriage 2 is optionally decided in the practical embodiment.

The recording head 3 ejects an active ray curable type ink such as a UV curable ink toward the recording material P from the ejecting opening by the action of plural ejecting means, not shown in the drawing, provided in the recording head; the ink is supplied by an ink supplying means not shown in the drawing. The UV ink to be ejected from the recording head 3 contains the colorant, polymerizable monomer and initiator and the ink is cured by crosslinking and polymerization reaction of the monomer by the action of the initiator as the catalyst when the ink is irradiated by UV-rays.

The recording head 3 is moved from one end to the other end of the recording material P along the direction Y in FIG. 1 for scanning the recording material P by driving by the scanning means and ejects the UV ink in the form of droplet toward the designated area (the landing area) so as to land the ink droplets onto the landing area.

The above scanning is repeated for suitable times for ejecting the UV ink onto one landing area and then the recording material P is suitably moved in the direction of from this side to rear side in FIG. 1 and then the recording head 3 ejects UV ink onto the next landing area adjacent to the rear side in FIG. 1 while scanning by the scanning means.

An image composed of aggregation of UV ink droplets is formed on the recording material P by repeating the above operation for ejecting the UV ink from the recording head 3 working together with the head scanning means and the conveying means.

The irradiating means 4 is constituted by a UV-ray lamp generating specific wavelength UV-ray with stable exposing energy and a filter capable of permeating UV-ray having specific wavelength. As the UV-ray lamp, a mercury lamp, a metal halide lamp, an excimer laser, a UV-ray laser, a cold cathode tube, a black light and LED (light emitting diode) are applicable and a band-shaped metal halide lamp, the cold cathode tube, mercury lamp and black light are referred. Particularly, a low pressure mercury lamp irradiating UV-ray of wavelength of 254 nm, the cold cathode tube, a hot cathode tube and a sterilizing lamp are preferable, by which spreading of the ink and dot diameter controlling can be carried out with high efficiency. The irradiating means for curing the UV ink can be prepared at a low cost by using the black light for the radiation source of the irradiating means 4.

The irradiating means has a size similar to or larger than the largest size capable of being set in the recording apparatus (UV ink-jet printer) 1 within the landing area in which the UV ink is ejected by once scanning by the recording head 3 driven by the head scanning means.

The irradiating means 4 is fixed on both sides of the head carriage in parallel with the recording material P.

For controlling the illuminance at the ink ejecting portion, it is of course effective to entirely shield the recording head 3 from light, moreover, to make larger the distance h2 between the ink ejecting portion 31 of the recording head 3 and the recording material P than the distance h1 between the irradiation means 4 and the recording material P (h1<h2), or to increase the distance d between the recording head 3 and the irradiation means 4 are also effective. It is more preferable to constitute a bellows 7 structure between the recording head 3 and the irradiation means 4.

The wavelength of the UV-ray irradiated from the irradiating means can be suitably changed by changing the UV lamp or the filter provided in the irradiation means 4.

The ink of the invention is excellent in the ejection stability and particularly effective for forming an image using a line-head type recording apparatus.

Figure 2:
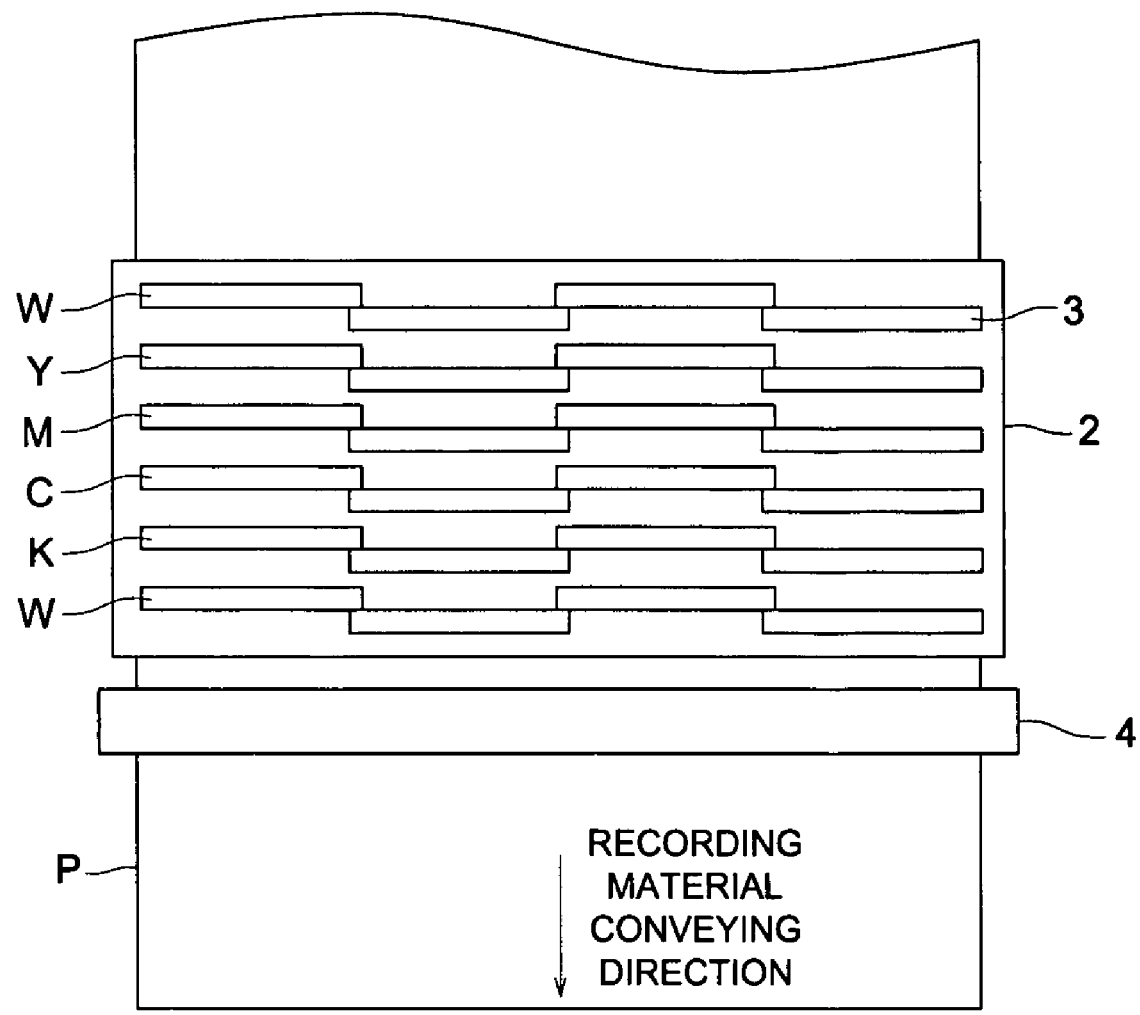
FIG. 2 is an upper view of another example of primary sub-systems of an ink-jet recording apparatus of the invention.

FIG. 2 shows another example of the principle portion of the ink-jet recording apparatus.

The ink-jet recording apparatus shown in FIG. 2 is called as a line-head system, in which the recording heads 3 of each colors are arranged and fixed on the head carriage 2 so as to cover the entire width of the recording material P.

The irradiating means 4 is arranged at the downstream of the head carriage 2 so as to cover the entire width of the recording material P.

In the line-head system, the head carriage 2 and the irradiation means 4 are fixed and the recording material is only conveyed on which the ink is ejected and cured for forming an image.

EXAMPLES

This invention is specifically described below referring examples but the embodiment of the invention is not limited to the examples.

(Measurement of Amine Value of Dispersing Agent)

The dispersing agent was dissolved in methyl isobutyl ketone and subjected to potentiometric titration by a 0.01 moles/liter methyl isobutyl ketone solution of perchlorate and the result was converted into KOH mg/g for determining the amine value. The potentiometric titration was carried out by an automatic titrating apparatus COM-1500 manufactured by Hiranuma Snagyo Co., Ltd.

(Measurement of Acid Value of Dispersing Agent)

The dispersing agent was dissolved in methyl isobutyl ketone and subjected to potentiometric titration by a 0.01 moles/liter methyl isobutyl ketone solution (4:1) of potassium methoxide, and the result was converted into KOH mg/g for determining the acid value. The potentiometric titration was carried out by an automatic titrating apparatus COM-1500 manufactured by Hiranuma Snagyo Co., Ltd.

(Preparation of Dispersion A)

The pigment was dispersed by the following procedure. The following compounds were put into a stainless steel beaker and heated and stirred for 1 hour on a hot plate of 65° C. for dissolving.

| | |
|---|---|
| Dispersing agent PB824 manufactured by Ajinomoto Co., Ltd. (Acid value: 32.5 mg/g, Amine value: 19.1 mg/g) | 8 parts |
| Tetraethylene glycol diacrylate (di-functional compound) | 72 parts |

The resultant solution was cooled by room temperature and 20 parts of one of the following pigment was added. The mixture was put into a glass bottle together with 200 g of zirconia beads having a diameter of 1 mm, and the bottle was tightly stopped and shaken by a paint shaker for the following time. After that, the zirconia beads were removed to obtain Dispersion A.

Pigment K (Pigment Black 7, MA 7 manufactured by Mitsubishi Kagaku Co., Ltd.): 10 hours Pigment C (Pigment Blue 15:4, Cyanine Blue 4044 manufactured by Sanyo Shikiso Co., Ltd.): 6 hours Pigment M (Pigment Red 122, PV Fast Pink E01 manufactured by Clariant Co., Ltd.): 6 hours Pigment Y (Pigment Yellow 180, PV Fast Yellow HG01 manufactured by Clariant Co., Ltd.): 9 hours (Preparation of Dispersion B)

The pigment was dispersed by the following procedure. The following compounds were put into a stainless steel beaker and heated and stirred for 1 hour on a hot plate of 65° C. for dissolving.

| | |
|---|---|
| Dispersing agent PB822 manufactured by Ajinomoto Co., Ltd. (Acid value: 18.5 mg/g, Amine value: 15.9 mg/g) | 9 parts |
| Oxetane compound OXT211 manufactured by Toa Gosei Co., Ltd. | 71 parts |

The resultant solution was cooled by room temperature and 20 parts of the following pigment was added. The mixture was put into a glass bottle together with 200 g of zirconia beads having a diameter of 1 mm, and the bottle was tightly stopped and shaken by a paint shaker for the following time. After that, the zirconia beads were removed to obtain Dispersion B.

Pigment K (Pigment Black 7, #7 manufactured by Mitsubishi Kagaku Co., Ltd.): 10 hours Pigment C (Pigment Blue 15:4, Cyanine Blue 4044 manufactured by Sanyo Shikiso Co., Ltd.): 6 hours Pigment M (Pigment Violet 19, PV Fast Red E5B manufactured by Clariant Co., Ltd.): 6 hours Pigment Y (Pigment Yellow 120, Hostaperm Yellow H2G manufactured by Clariant Co., Ltd.): 9 hours (Preparation of Dispersion C)

The pigment was dispersed by the following procedure. The following compounds were put into a stainless steel beaker and heated and stirred for 1 hour on a hot plate of 65° C. for dissolving.

| | |
|---|---|
| Dispersing agent KF-1300M manufactured by Kawaken Fine Chemicals Co., Ltd. (Acid value: 26.2 mg/g, Amine value: 17.8 mg/g) | 10 parts |
| Tetraethylene glycol diacrylate (D-functional compound) | 70 parts |

The resultant solution was cooled by room temperature and 20 parts of the following pigment was added. The mixture was put into a glass bottle together with 200 g of zirconia beads having a diameter of 1 mm, and the bottle was tightly stopped and shaken by a paint shaker for the following time. After that, the zirconia beads were removed to obtain Dispersion C.

Pigment K (Pigment Black 7, MA7 manufactured by Mitsubishi Kagaku Co., Ltd.): 10 hours Pigment C (Pigment Blue 15:4, Blue No. 32 manufactured by Dainichi Seika Co., Ltd.): 8 hours Pigment M (Pigment Violet 122, Chromofine Red 6887 manufactured by Dainichi Seika Co., Ltd.): 6 hours Pigment Y (Pigment Yellow 120, Hostaperm. Yellow H2G manufactured by Clariant Co., Ltd.): 6 hours Pigment W (Titanium oxide, Special ordered product manufactured by Nihon Pigment Co., Ltd): 10 hours (Preparation of Dispersion D)

The pigment was dispersed by the following procedure. The following compounds were put into a stainless steel beaker and heated and stirred for 1 hour on a hot plate of 65° C. for dissolving.

| | |
|---|---|
| Dispersing agent T600 manufactured by Kawaken Fine Chemicals Co., Ltd. (Acid value: 36.0 mg/g, Amine value: 12.4 mg/g) | 8 parts |
| Oxetane compound OXT221 manufactured by Toa Gosei Co., Ltd. | 72 parts |

The resultant solution was cooled by room temperature and 20 parts of the following pigment was added. The mixture was put into a glass bottle together with 200 g of zirconia beads having a diameter of 1 mm, and the bottle was tightly stopped and shaken by a paint shaker for the following time. After that, the zirconia beads were removed to obtain Dispersion D.

Pigment K (Pigment Black 7, #52 manufactured by Mitsubishi Kagaku Co., Ltd.): 10 hours Pigment C (Pigment Blue 15:4, Blue No. 32 manufactured by Dainichi Seika Co., Ltd.): 8 hours Pigment M (Pigment Red 122, PV Fast Pink E01 manufactured by Clariant Co., Ltd.): 8 hours Pigment Y (Pigment Yellow 180, PV Fast Yellow HG01 manufactured by Clariant Co., Ltd.): 6 hours Pigment W (Titanium oxide, Special ordered product manufactured by Nihon Pigment Co., Ltd): 10 hours (Preparation of Dispersion E Using Basic Dispersing Agent)

The pigment was dispersed by the following procedure. The following compounds were put into a stainless steel beaker and heated and stirred for 1 hour on a hot plate of 65° C. for dissolving.

| | |
|---|---|
| Dispersing agent Solsperse 32000 manufactured by Abisia Co., Ltd. (Acid value: 24.8 mg/g, Amine value: 27.1 mg/g) | 8 parts |
| OXT221 | 72 parts |

The resultant solution was cooled by room temperature and 20 parts of the following pigment was added. The mixture was put into a glass bottle together with 200 g of zirconia beads having a diameter of 1 mm, and the bottle was tightly stopped and shaken by a paint shaker for the following time. After that, the zirconia beads were removed to obtain Dispersion E.

Pigment K (Pigment Black 7, #52 manufactured by Mitsubishi Kagaku Co., Ltd.): 10 hours Pigment C (Pigment Blue 15:4, Cyanine Blue 4044 manufactured by Sanyo Shikiso Co., Ltd.): 10 hours Pigment M (Pigment Red 122, Chromofine Red 321 manufactured by Dainichi Seika Co., Ltd.): 8 hours Pigment Y (Pigment Yellow 120, Hostaperm Yellow H2G manufactured by Clariant Co., Ltd.): 10 hours Pigment W (Titanium oxide, Special ordered product manufactured by Nihon Pigment Co., Ltd): 10 hours (Preparation of Active Ray Curable Type Ink for Ink-Jet, also Simply Referred to as Ink)

Inks were prepared each according to the composition described in Tables 1 and 2 and filtered by a 3 μm Teflon® membrane filter manufactured by Advantec Co., Ltd. The average diameter and the viscosity of each of the inks are listed in the tables.

The average diameter is volume average diameter of the pigment particles in the ink measured by Zetasizer Nano series manufactured by Malvern Instruments Ltd. Namely, the average particle diameter of the ink in this invention is the volume average diameter value which is obtained by measuring a sample prepared by diluting 10,000 times the ink by the following polymerizable composition and satisfactorily stirring at 25° C. by Zetasizer Nano series manufactured by Malvern Instruments Ltd.

In these examples, tetraethylene glycol diacrylate was used as the polymerizable composition for diluting each of Ink Compositions 1, 2 and 5 and OXT221, oxetane compound manufactured by Toa Gosei Co., Ltd., was used for diluting each of Ink Compositions 3, 4 and 6.

TABLE 1

| | | K | C | M | Y |
|---|---|---|---|---|---|
| Ink Composition 1 (Comparative) | | | | | |
| Dispersion E | | 12.5 | 12.5 | 20.0 | 23.5 |
| Photo-polymerizable compound | Lauryl acrylate (mono-functional) | 16.5 | 16.5 | 9.0 | 5.5 |
| Photo-polymerizable compound | Tetraethylene glycol diacrylate (di-functional) | 36.0 | 36.0 | 36.0 | 36.0 |

TABLE 1-continued

|  |  | K | C | M | Y |
|---|---|---|---|---|---|
| Photo-polymerizable compound | Trimethylol propane triacrylate (trifunctional) | 30.0 | 30.0 | 30.0 | 30.0 |
| Photo polymerization initiator | Irgacure 819 (Ciba Specialty Chemicals Co., Ltd.) | 2.5 | 2.5 | 2.5 | 2.5 |
| Photo polymerization initiator | Irgacure 184 (Ciba Specialty Chemicals Co., Ltd.) | 2.5 | 2.5 | 2.5 | 2.5 |
|  | Average particle diameter of ink (μm) | 0.099 | 0.095 | 0.120 | 0.112 |
|  | Viscosity of ink at 25° C. (mPa · s) | 32.0 | 30.0 | 40.0 | 35.0 |
| Ink Composition 2 (Inventive) | | | | | |
| Dispersion A |  | 12.5 | 12.5 | 15.0 | 12.5 |
| Photo-polymerizable compound | Lauryl acrylate (mono-functional) | 26.4 | 26.4 | 23.9 | 26.4 |
| Photo-polymerizable compound | Tetraethylene glycol diarylate (di-functional) | 30.0 | 30.0 | 30.0 | 30.0 |
| Photo-polymerizable compound | Caprolactum-modified dipentaerythritol hexacrylate (hexa-functional) | 25.0 | 25.0 | 25.0 | 25.0 |
| Modified silicone oil | SDX-1843 (Asahi Denka Kogyo Co., Ltd.) | 0.10 | 0.10 | 0.10 | 0.10 |
| Photo polymerization initiator (radical initiator) | Irgacure 184 (Ciba Specialty Chemicals Co., Ltd.) | 3.0 | 3.0 | 3.0 | 3.0 |
| Photo polymerization initiator (radical initiator) | Irgacure 907 (Ciba Specialty Chemicals Co., Ltd.) | 3.0 | 3.0 | 3.0 | 3.0 |
|  | Average particle diameter of ink (μm) | 0.101 | 0.099 | 0.116 | 0.142 |
|  | Viscosity of ink at 25° C. (mPa · s) | 25.0 | 25.0 | 32.0 | 30.0 |
| Ink Composition 3 (Inventive) | | | | | |
| Dispersion B |  | 12.5 | 12.5 | 17.5 | 15.0 |
| Photo-polymerizable compound (epoxidized linseed oil) | Vikoflex9040 (ATOFINA) | 4.0 | 4.0 | 4.0 | 4.0 |
| Photo-polymerizable compound (alicyclic epoxy compound) | Compound EP-1 | 33.9 | 33.9 | 28.9 | 31.4 |
| Photo-polymerizable compound (oxetane compound) | OXT-221 (Toa Gosei Co., Ltd.) | 30.0 | 30.0 | 30.0 | 30.0 |
| Photo-polymerizable compound (oxetane compound) | OXT-212 (Toa Gosei Co., Ltd.) | 7.0 | 7.0 | 7.0 | 7.0 |
| Basic compound | Tripropanolamine | 0.10 | 0.10 | 0.10 | 0.10 |
| Nonionic fluorosurfactant | Megafack F-178 (Dainihon Ink Kagaku Kogyo Co., Ltd.) | 0.02 | 0.02 | 0.02 | 0.02 |
| Modified silicone oil | KF-351 (Shin'etsu Silicone Co., Ltd.) | 0.50 | 0.50 | 0.50 | 0.50 |
| Glycol ether (phase solubilizing agent) | Hisolv BDB (Toho Kasei Co., Ltd.) | 7.00 | 7.00 | 7.00 | 7.00 |
| Photo polymerization initiator (Photo acid generating agent) | UV16992 (Dow Chemical Co., Ltd.) | 5.0 | 5.0 | 5.0 | 5.0 |
|  | Average particle diameter of ink (μm) | 0.115 | 0.101 | 0.131 | 0.158 |
|  | Viscosity of ink at 25° C. (mPa · s) | 28.0 | 27.0 | 35.0 | 33.0 |

TABLE 2

| Ink Composition 4 (Comparative) | | | | | | |
|---|---|---|---|---|---|---|
|  |  | K | C | M | Y | W |
| Dispersion F |  | 12.5 | 12.5 | 20.5 | 15.0 | 50.0 |
| Photo-polymerizable compound (alicyclic epoxy compound) | Celloxide (Daicel Kagaku Co., Ltd.) | 34.5 | 34.5 | 26.5 | 32.0 | 37.0 |
| Photo-polymerizable compound (oxetane compound) | OXT-221 (Toa Gosei Co., Ltd.) | 40.0 | 40.0 | 40.0 | 40.0 | 0.0 |
| Photo-polymerizable compound | OXT-101 (Toa Gosei Co., Ltd.) | 10.0 | 10.0 | 10.0 | 10.0 | 10.0 |

TABLE 2-continued

| | | | | | | |
|---|---|---|---|---|---|---|
| (oxetane compound) | | | | | | |
| Photo polymerization initiator (photo acid generating agent) | DTS-102 (Midori Kagaku Co., Ltd.) | 3.0 | 3.0 | 3.0 | 3.0 | 3.0 |
| | Average particle diameter of ink (μm) | 0.125 | 0.099 | 0.112 | 0.185 | 0.240 |
| | Viscosity of ink at 25° C. (mPa·s) | 15.0 | 17.0 | 22.0 | 20.0 | 20.0 |

| Ink Composition (Inventive) | | | | | |
|---|---|---|---|---|---|
| | | K | C | M | Y |
| Dispersion C | | 12.5 | 12.5 | 17.5 | 15.0 |
| Photo-polymerizable compound | NK Ester A-400 (Shin Nakamura Kagaku Co., Ltd.) | 25 | 20 | 25 | 20 |
| Water | Purified water | 39.5 | 44.5 | 34.5 | 42.0 |
| Water-soluble organic solvent | Ethylene glycol (reagent grade) | 5 | 5 | 5 | 5 |
| Water-soluble organic solvent | Iso-propyl alcohol (reagent grade) | 12 | 12 | 12 | 12 |
| Photo polymerization initiator (photo radical initiator) | Irgacure 2959 (Ciba Specialty Chemicals Co., Ltd.) | 3 | 3 | 3 | 3 |
| Photo polymerization initiator (photo radical initiator) | Irgacure 651 (Ciba Specialty Chemicals Co., Ltd.) | 3 | 3 | 3 | 3 |
| | Average particle diameter of ink (μm) | 0.135 | 0.110 | 0.158 | 0.165 |
| | Viscosity of ink at 25° C. (mPa·s) | 9.0 | 8.0 | 14.0 | 12.0 |

| Ink Composition 6 (Inventive) | | | | | | |
|---|---|---|---|---|---|---|
| | | K | C | M | Y | W |
| Dispersion D | | 12.5 | 12.5 | 17.5 | 12.5 | 50.0 |
| *1 (oxetane compound) | OXT-221 Toa Gosei Co., Ltd. | 30.0 | 30.0 | 30.0 | 30.0 | 0.0 |
| *1 (alicyclic epoxy compound) | Celloxide 2021P (Daicel Kagaku Co., Ltd.) | 15.0 | 15.0 | 15.0 | 15.0 | 15.0 |
| *1 (oxetane compound) | OXT-212 (Toa Gosei Co., Ltd.) | 10.0 | 10.0 | 10.0 | 10.0 | 7.0 |
| *1 (butyl ester of epoxidized fatty acid) | E-4030 (Shin Nihon Rika Co., Ltd.) | 7.3 | 7.3 | 2.3 | 7.3 | 2.8 |
| *1 (alicyclic epoxidized compound) | Compound EP-2 | 15.0 | 15.0 | 15.0 | 15.0 | 15.0 |
| Basic compound | *2 | 0.1 | 0.1 | 0.1 | 0.1 | 0.1 |
| Modified silicone oil | XF42-334 (GE Toshiba Silicone Co., Ltd.) | 0.10 | 0.10 | 0.10 | 0.10 | 0.10 |
| Anisole (phase solubilizing agent) | Hichemic MB (Toho Kagaku Co., Ltd.) | 5.00 | 5.00 | 5.00 | 5.00 | 5.00 |

TABLE 2-continued

| Photo polymerization initiator (photo acid generating agent) | SP152 (Asahi Denka Kogyo Co., Ltd.) | 5.0 | 5.0 | 5.0 | 5.0 | 5.0 |
|---|---|---|---|---|---|---|
| | Average particle diameter of ink (μm) | 0.110 | 0.098 | 0.148 | 0.178 | 0.182 |
| | Viscosity of ink at 25° C. (mPa·s) | 31.0 | 32.0 | 38.0 | 36.0 | 38.0 |

*1: Photo-polymerizable compound
*2: Triisopropanolamine

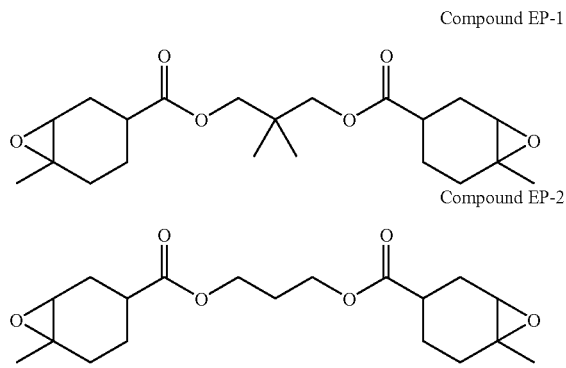

Compound EP-1

Compound EP-2

In the tables, the inks are represented by the following symbols.
W: White ink
K: Black ink
C: Cyan ink
M: Magenta ink
Y: Yellow ink <<Ink-Jet Image Forming Method>>

Each of the ink sets (active ray curable ink-jet ink sets) 1 to 3 prepared as above was charged into a ink-jet recording apparatus having the constitution with piezo type ink-jet nozzles shown in FIG. 2, and the following images were continuously recorded onto the long length recording material having a width of 600 mm and a length of 500 m described in the table. The ink supplying system is constituted by an ink tank, a supplying pipe, a previous ink tank arranged at just before the head, a piping with a filter and the piezo head, and the previous ink tank and the head portion were thermally insulated and heated at 50° C. The piezo head was driven so as to eject multi-size dots of 2 to 15 pl at a resolution of 720×720 dpi and each of inks were continuously ejected. The temperature of the ink after landing onto the recording material was held at about 40° C. by holding the temperature of the conveying guide plate (platen) at 40° C. The ink was instantaneously (less than 1 second after landing) cured after landing onto the recording material by the lamp units arranged on the both sides of the carriage. The total thickness of the ink layer was within the range of from 2.3 to 18 μm according to the measurement after the recording. In this invention, the dpi is number of the dots per 2.54 cm. The formation of the ink-jet image was carried in high humidity environment of 80% RH and 27° C.

Images were formed by an ink-jet recording apparatus by the line-head system shown in FIG. 2 using each of Ink Composition Sets 4 to 6.

The acronyms of the recording material shown in Table 3 are as follows.
Yupo FGS: Commercial name, Product of Yupo Corp.
PET: Polyethylene terephthalate
PVC: Polyvinyl chloride

TABLE 3

| | | | Irradiating condition *1 | | | |
|---|---|---|---|---|---|---|
| Sample No. | Ink | Recording material | Irradiation light source | Irradiation timing | The maximum illuminance on the recording material surface and the peak *2 wavelength | Remarks |
| 1 | Ink Composition 1 | PET | *3 | 0.1 seconds after landing | *5 400 mW/cm² at 365 nm | Comp. |
| 2 | Ink Composition 1 | PVC | *3 | 0.1 seconds after landing | *5 400 mW/cm² at 365 nm | Comp. |
| 3 | Ink Composition 2 | PET | *3 | 0.1 seconds after landing | *5 400 mW/cm² at 365 nm | Inv. |
| 4 | Ink Composition 2 | PVC | *3 | 0.1 seconds after landing | *5 400 mW/cm² at 365 nm | Inv. |
| 5 | Ink Composition 3 | PET | *3 | 0.1 seconds after landing | *5 400 mW/cm² at 365 nm | Inv. |
| 6 | Ink Composition 3 | PVC | *3 | 0.1 seconds after landing | *5 400 mW/cm² at 365 nm | Inv. |

TABLE 3-continued

| Sample No. | Ink | Recording material | Irradiation light source | Irradiation timing | The maximum illuminance on the recording material surface and the peak *2 wavelength | Remarks |
|---|---|---|---|---|---|---|
| 7 | Ink Composition 4 | High quality paper | *4 | 0.1 seconds after landing | *6 160 mW/cm$^2$ at 254 nm | Comp. |
| 8 | Ink Composition 4 | Yupo FGS | *4 | 0.1 seconds after landing | *6 160 mW/cm$^2$ at 254 nm | Comp. |
| 9 | Ink Composition 4 | PVC | *4 | 0.1 seconds after landing | *6 160 mW/cm$^2$ at 254 nm | Comp. |
| 10 | Ink Composition 5 | High quality paper | *3 | 0.1 seconds after landing | *5 400 mW/cm$^2$ at 365 nm | Inv. |
| 11 | Ink Composition 6 | High quality paper | *4 | 0.1 seconds after landing | *6 160 mW/cm$^2$ at 254 nm | Inv. |
| 12 | Ink Composition 6 | Yupo FGS | *4 | 0.1 seconds after landing | *6 160 mW/cm$^2$ at 254 nm | Inv. |
| 13 | Ink Composition 6 | PVC | *4 | 0.1 seconds after landing | *6 160 mW/cm$^2$ at 254 nm | Inv. |

*1: Illuminance was measured by UVPF-A1 manufactured by Iwasaki Denki Co., Ltd.
*2: Irradiation method (area)
*3: High pressure mercury lamp V Zero 085 manufactured by Integration Technology Co., Ltd.,
*4: Low pressure mercury lamp for 200 V power source specially ordered product by Nippo Co., Ltd.
*5: The lamp units are arranged on the both sides of the recording head as shown in FIG. 1.
*6: Line light was irradiated at the downstream in recording material conveying direction as shown in FIG. 2.,
Comp.: Comparative,
Inv.: Inventive, <<Evaluation of Ink-Jet Recorded Images>>

The images formed by the above image forming method at points 1 m, 10 m, 50 m and 100 m from the starting point of the recording material were evaluated ejection stability of each of the inks based on quality of the images.

(Quality of Character Image)

Characters of 6-point MS Ming type were printed using each of Y, M, C and K inks and the roughness of the character image was magnified and observed through a loupe and quality of the character was evaluated on the following standards.

4: No rough edges of characters was observed.

3: Only slight roughening of characters was observed.

2: Although rough text edges were observed, the text images could be easily distinguished but quality thereof was at the lowest level acceptable for practical use.

1: The edges of character images were considerably rough and patchy and the quality thereof was unacceptable for practical use.

(Color Mixing or Blurring)

One of each of Y, M, C and K colored dots was printed at 720 dpi so that dots were adjacent to each other and the degree of blurring of each of the dots was magnified and visually observed through a loupe, whereby color mixing was evaluated based on the following criteria.

4: The shape of adjacent dots maintained true circle with no blurring.

3: The shape of adjacent dots maintained almost a true circle with minimal blurring.

2: Adjacent dots were slightly blurred and the shape of the dots was deformed, however the degree of blurring was at the lowest acceptable level for practical use.

1: Adjacent dots were blurred and colors were mixed, resulting in unacceptable textural images for practical use.

The thus obtained evaluation results are displayed in Table 4.

TABLE 4

| | 1 m | | 10 m | | 50 m | | 100 m | | |
|---|---|---|---|---|---|---|---|---|---|
| Sample No. | Character quality | Color blurring | Character quality | Color blurring | Character quality | Color blurring | Character quality | Color blurring | Remarks |
| 1 | 3 | 3 | 1 | 1 | 1 | 1 | 1 | 1 | Comp. |
| 2 | 3 | 3 | 1 | 1 | 1 | 1 | 1 | 1 | Comp. |
| 3 | 4 | 4 | 4 | 4 | 3 | 3 | 3 | 3 | Inv. |
| 4 | 3 | 3 | 3 | 3 | 3 | 3 | 2 | 2 | Inv. |
| 5 | 4 | 4 | 4 | 4 | 4 | 4 | 4 | 4 | Inv. |
| 6 | 4 | 4 | 4 | 4 | 4 | 4 | 4 | 4 | Inv. |
| 7 | 3 | 2 | 3 | 2 | 1 | 1 | 1 | 1 | Comp. |
| 8 | 4 | 4 | 4 | 4 | 1 | 3 | 1 | 3 | Comp. |
| 9 | 4 | 4 | 4 | 4 | 1 | 1 | 1 | 1 | Comp. |
| 10 | 3 | 3 | 3 | 3 | 3 | 2 | 2 | 2 | Inv. |
| 11 | 3 | 3 | 3 | 3 | 3 | 3 | 3 | 3 | Inv. |

TABLE 4-continued

| Sample No. | 1 m Character quality | 1 m Color blurring | 10 m Character quality | 10 m Color blurring | 50 m Character quality | 50 m Color blurring | 100 m Character quality | 100 m Color blurring | Remarks |
|---|---|---|---|---|---|---|---|---|---|
| 12 | 4 | 4 | 4 | 4 | 4 | 4 | 4 | 4 | Inv. |
| 13 | 4 | 4 | 4 | 4 | 4 | 4 | 4 | 4 | Inv. |

Comp.: Comparative,
Inv.: Inventive

High definition image could be very stably formed explaining the embodiments of this invention.

PROBABILITY OF INDUSTRIAL APPLICATION

The active ray curable ink-jet ink set, image forming method and ink-jet recording apparatus, can be provided by this invention, by which a high definition image excellent in the character quality without color mixing can be very stably reproduced.

What is claimed is:

1. An active ray curable ink-jet ink set comprising an active ray curable yellow ink, an active ray curable cyan ink, an active ray curable black ink, and further one or more of active ray curable color inks other than yellow, cyan and black,
    wherein each of the active ray curable yellow ink, the active ray curable cyan ink, the active ray curable black ink, and the active ray curable color inks other than yellow, cyan and black, contains a photo-polymerization initiator, a photo-polymerizable compound, a pigment, and a dispersing agent which has an amine value and an acid value, provided that the acid value is higher than the amine value, and
    an average particle diameter of the pigment contained in the yellow ink is larger than an average particle diameter of the pigment contained in the cyan ink and an average particle diameter of the pigment contained in the black ink by 0.025-0.090 μm, and further an average particle diameter of the pigment contained in each of the inks of the active ray curable ink-jet ink set is 0.070-0.220 μm.

2. The active ray curable ink-jet ink set described in claim 1,
    wherein an average particle diameter of the pigment contained in the active ray curable yellow ink is 0.130-0.220 μm, and an average particle diameter of the pigment contained in the active ray curable cyan ink and an average particle diameter of the pigment contained in the active ray curable black ink are each 0.070-0.120 μm.

3. The active ray curable ink-jet ink set described in claim 1,
    wherein the photo-polymerizable compound contains a compound having at least one oxirane group.

4. The active ray curable ink-jet ink set described in claim 1,
    wherein the photo-polymerizable compound contains 30-95% by weight of a compound having at least one oxetane ring, 5-70% by weight of a compound having at least one oxirane group and 0-40% by weight of at least one vinyl ether compound.

5. The active ray curable ink-jet ink set described in claim 1,
    wherein the viscosity of each of the active ray curable yellow ink, the active ray curable cyan ink, the active ray curable black ink, and the active ray curable color inks other than yellow, cyan and black, is 7-50 mPa·s at 25° C.

6. An active ray curable ink-jet ink set comprising an active ray curable yellow ink, an active ray curable cyan ink, an active ray curable black ink, and further one or more of active ray curable color inks other than yellow, cyan and black,
    wherein each of the active ray curable yellow ink, the active ray curable cyan ink, the active ray curable black ink, and the active ray curable color inks other than yellow, cyan and black, contains a photo-polymerization initiator, a photo-polymerizable compound, a pigment, and a dispersing agent which has an amine value and an acid value, provided that the acid value is higher than the amine value, and
    an average particle diameter of the pigment contained the active ray curable yellow ink is 0.130-0.220 μm, and an average particle diameter of the pigment contained in the active ray curable cyan ink and an average particle diameter of the pigment contained in the active ray curable black ink are each 0.070-0.120 μm.

7. The active ray curable ink-jet ink set described in claim 6,
    wherein the active ray curable color ink other than yellow, cyan and black is an active ray curable magenta ink,
    and an average particle diameter of the pigment contained in the active ray curable magenta ink is 0.100-0.150 μm.

8. The active ray curable ink-jet ink set described in claim 6,
    wherein the active ray curable color ink other than yellow, cyan and black is an active ray-curable white ink,
    and an average particle diameter of the pigment contained in the active ray curable white ink is 0.130-0.220 μm.

9. A method for forming an image comprising the steps of:
    a. ejecting the active ray curable yellow ink, the active ray curable cyan ink, the active ray curable black ink, and the active ray curable color inks other than yellow, cyan and black, contained in the active ray curable ink-jet ink set described in claim 1, from an ink-jet recording head onto a recording medium, and
    b. irradiating active rays onto the ejected inks to form the image,
    wherein active rays are irradiated within 0.001-1.0 second after the landing of the active ray curable ink-jet inks onto the recording medium.

10. The method for forming an image described in claim 9, wherein the total thickness of the ink layers after being cured by irradiation of active rays is 2-20 μm.

11. The method for forming an image described in claim 9, wherein a volume of ink droplets ejected from each nozzle of the ink-jet recording head is 2-15 pl.

12. The method for forming an image described in claim 9, wherein the image is formed by ejecting of the inks from a line head type recording head.

13. An ink-jet recording apparatus to be used for the image forming method described in claim 9, wherein the ink-jet recording apparatus has a mechanism to heat the active ray curable ink-jet inks and the recording head to 35-100° C. before ejecting the inks.

* * * * *